(12) United States Patent
Hayton

(10) Patent No.: US 7,316,246 B2
(45) Date of Patent: Jan. 8, 2008

(54) HOSE ASSEMBLY

(75) Inventor: Paul R Hayton, Bristol (GB)

(73) Assignee: Rolls-Royce, PLC., London (GB)

( * ) Notice: Subject to any disclaimer, the term of this patent is extended or adjusted under 35 U.S.C. 154(b) by 350 days.

(21) Appl. No.: 10/859,083

(22) Filed: Jun. 3, 2004

(65) Prior Publication Data

US 2005/0011570 A1 Jan. 20, 2005

(30) Foreign Application Priority Data

Jun. 30, 2003 (GB) ................. 0315241.0
May 25, 2004 (GB) ................. 0411623.2

(51) Int. Cl.
*F16L 11/00* (2006.01)

(52) U.S. Cl. ............... 138/110; 138/106; 138/112

(58) Field of Classification Search ........... 138/110, 138/106, 107, 112
See application file for complete search history.

(56) References Cited

U.S. PATENT DOCUMENTS

| 1,721,218 | A | * | 7/1929 | Hood ................. 174/70 A |
| 3,086,369 | A | * | 4/1963 | Brown ................ 405/172 |
| 3,428,092 | A | * | 2/1969 | Skinner et al. ........ 138/110 |
| 3,677,339 | A | * | 7/1972 | Perrin et al. .......... 165/162 |
| 3,782,452 | A | * | 1/1974 | Ceplon ............... 165/135 |
| 4,046,408 | A | | 9/1977 | Ausnit |
| 4,092,997 | A | | 6/1978 | Hansen |
| 4,244,544 | A | | 1/1981 | Kornat |
| 4,445,255 | A | * | 5/1984 | Olejak ................ 24/284 |
| 4,514,103 | A | * | 4/1985 | Wise et al. ........... 138/106 |
| 4,611,656 | A | * | 9/1986 | Kendall et al. ........ 166/65.1 |
| 4,662,712 | A | * | 5/1987 | Tabata et al. ......... 385/102 |
| 4,850,396 | A | * | 7/1989 | McClish et al. ....... 138/103 |
| 5,073,682 | A | * | 12/1991 | Walling et al. ........ 174/70 A |
| 5,226,456 | A | * | 7/1993 | Semak ................ 138/107 |
| 5,307,639 | A | * | 5/1994 | Boissin ............... 62/50.7 |
| 5,678,609 | A | * | 10/1997 | Washburn ............. 138/107 |
| 5,789,701 | A | * | 8/1998 | Wettengel et al. ..... 174/41 |
| 6,356,690 | B1 | * | 3/2002 | McAlpine et al. ...... 385/109 |
| 6,529,663 | B1 | * | 3/2003 | Parris et al. ......... 385/113 |
| 6,886,601 | B2 | * | 5/2005 | Allen ................. 138/107 |

FOREIGN PATENT DOCUMENTS

| DE | 298 21 373 U1 | 4/1999 |
| GB | 2 102 909 A | 2/1983 |

* cited by examiner

*Primary Examiner*—James Hook
(74) *Attorney, Agent, or Firm*—Oliff & Berridge, PLC.

(57) ABSTRACT

A hose assembly comprising a flexible hose and at least one co-extending flexible member. The hose and the member are secured together for tandem movement by means of at least one intermediate resilient mounting means. In operation tension and/or compression induced in the hose assembly by relative motion of the hose and co-extending flexible member is reduced by the compression and/or expansion of the at least one resilient mounting means.

13 Claims, 2 Drawing Sheets

HOSE ASSEMBLY

The invention relates to a hose assembly.

In particular the invention concerns a hose assembly which bridges a number of joints of an articulated assembly. In one particular embodiment the assembly includes a flexible hose carrying pressurised fluid and additional fluid carrying pipes, electrical wires or fibre optic cables which share a common route over the articulated assembly. Conventionally such additional pipes, wires, cables and the like are attached to hose like structures by some form of "P" clip, tie, band or clamp in a tandem relationship in order to prevent relative movement at the attachment points. Too few attachment points allow the additional pipes etc too much freedom of movement so they may become snagged or otherwise damaged. Too many attachment points will cause the additional pipes, wires and cables to be stretched in tension as the hose flexes in use. Repeated stretching may cause the additional pipes, wires and cables to become weakened and fail.

According to the present invention there is provided a hose assembly comprising a flexible hose, at least one co-extending flexible member, and resilient mounting means attaching the hose and flexible member together for tandem movement, the resilience of the mounting means being such that, in use, when the flexible hose is subject to a bending force which compresses or stretches the at least one co-extending flexible member, said resilient mounting means relieves the force.

The hose assembly is used in a particular embodiment to convey hydraulic fluid and electrical or optical control signals from power sources carried on a relatively static base member to a driven arrangement at the distal end of an articulated assembly. In the same way as the motion of the flexible hose is dependent upon the motion of the articulated assembly, the motion of the at least one co-extending flexible member is dependent upon the motion of the flexible hose. If the flexible hose and the at least one co-extending flexible member bend solely along a common neutral axis then the resilient mounting means has no effect. In such a situation where there is no relative movement between the flexible hose and the co-extending member the bending forces in the walls of the flexible hose and the co-extending member will be substantially equal.

There is relative movement which is accommodated by the resilient mounting means if the flexible hose and the co-extending member bend in a direction at right angles to the neutral axis of the hose assembly. Depending on the direction of bending the co-extending member will bend either around the outside or inside of the arc formed by the flexible hose. Hence the co-extending member will be either stretched (if forced to bend around a diameter greater than the arc of the flexible hose) or compressed (if forced around a diameter smaller than the arc of the flexible hose). The resilient mounting means relieves the stretching and/or compression in the co-extending flexible member. When the member is stretched, a force normal to the bending direction causes the resilient mounting means to contract, thereby reducing the diameter that the at least one co-extending flexible member is caused to bend around. When compressed, a force normal to the bending direction (and opposite to the direction when the at least co-extending flexible member is being stretched) causes the resilient mounting means to expand, thereby increasing the diameter of the co-extending flexible member is caused to bend around. Hence the bending force is relieved by allowing the distance between the flexible hose and the at least one co-extending flexible member to vary when they are bent.

Preferably the resilient mounting means extends coaxially with the flexible hose and the at least one co-extending flexible member. That is to say, while the resilient mounting means, the flexible hose and at least one co-extending flexible member do not share the same axis, their axes are all aligned such that they extend in the same direction.

Preferably the flexible hose has a substantially flat face formed along its length against which the resilient mounting means is abutted. The flat face ensures that the at least one co-extending flexible member is prevented from moving around the circumference of the hose, thereby preventing the at least one member from becoming more stretched or compressed when the flexible hose bends.

Preferably the resilient mounting means is adhered to the flexible hose and the at least one co-extending member by non-hardening glue. The flexible hose and at least one co-extending flexible member are both fixed to the mounting means and this is best achieved by use of a glue which has sufficient flexibility and elasticity such that the effectiveness of the glue is not diminished through damage caused by the motion of the flexible hose and the at least one co-extending flexible member. The glue may be provided along the full length of the substantially flat face of the flexible hose, the at least one co-extending flexible member and mounting means, such that all three components are in contact along the length of their common path. Such a hose assembly may be manufactured like this or the co-extending flexible members may be fitted to the flexible hose as required, for example, in situ on an articulating assembly where the flexible hose and at least one co-extending flexible member only travel along a common path for a part of their length.

In an alternative embodiment, at least some of the constituent parts of the hose assembly are formed integrally which each other. That is to say, some or all of the parts making up the hose assembly, namely the flexible hose, the at least one co-extending flexible member, resilient mounting means and restraining means, may be manufactured as one component. By way of non-limiting example, the hose assembly may be extruded or moulded with a hose, resilient mounting means and a co-extending member. Alternatively only part of the hose assembly may be extruded or moulded such that, for example, a hose with integral resilient mounting means is formed to which a co-extending flexible member can be attached when required.

In one embodiment the resilient mounting means comprises a plurality of individual mountings spaced apart along the length of the flexible hose and the at least one co-extending flexible member. This configuration is of particular advantage where the at least one co-extending flexible member is attached to the flexible hose after manufacture, for example, in situ on an articulating assembly where the flexible hose and at least one co-extending flexible member only travel along a common path for a part of their length.

Preferably an individual mounting includes restraining means which extends substantially around the periphery of the flexible hose.

Preferably an individual mounting includes restraining means which extends substantially around the periphery of the flexible member.

Preferably the restraining means comprises clips around the flexible hose and/or the flexible member.

Preferably, in use, the flexible hose carries fluid, and the flexible member comprises at least one electrically conductive or fibre optic element. However it will be appreciated that both the flexible hose and the at least one co-extending flexible member may be configured to carry, deliver or protect any fluid or solid, whether said fluid or solid are flowing along the pipe or act as a conduit for another medium, for example light or electricity.

The invention and how it may be carried into practice will now be described in greater detail with reference by way of example to embodiments illustrated in the accompanying drawings, in which.

Figure 3:
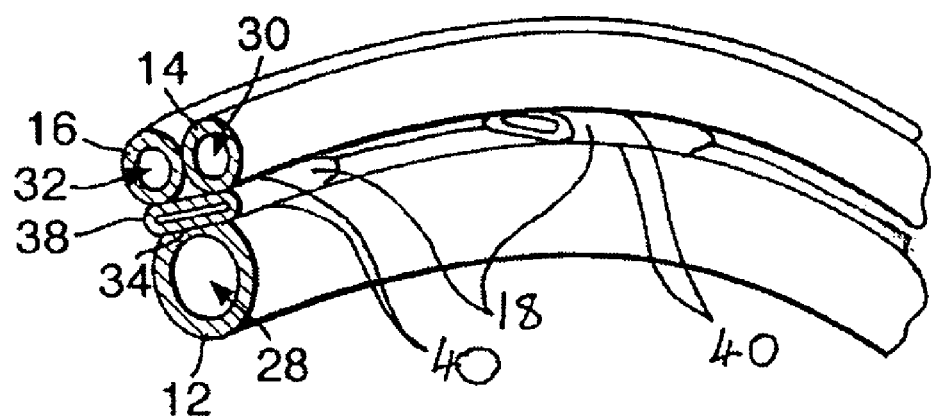
Figure 4:
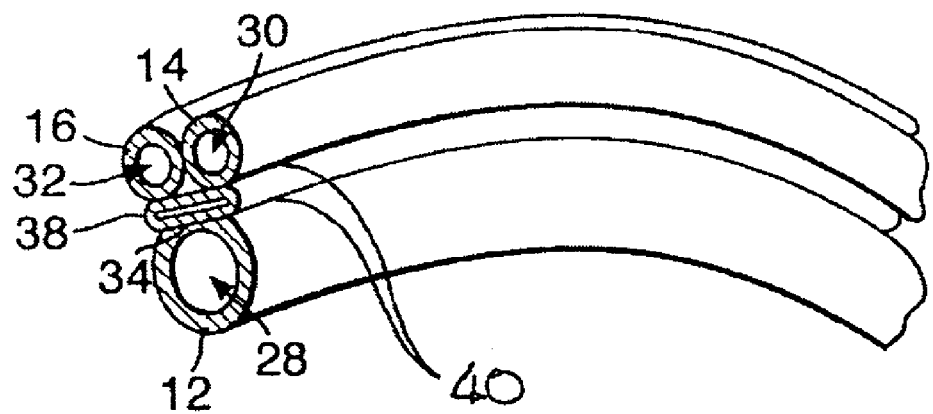

FIG. 3 is a perspective view of an alternative embodiment of the present invention showing a flexible hose and co-extending flexible members held together and glued to a plurality of individual resilient mounting members, and FIG. 4 is a perspective view of an alternative embodiment of the present invention showing a flexible hose and co-extending flexible members held together and glued to a single resilient mounting member.

Figure 1:
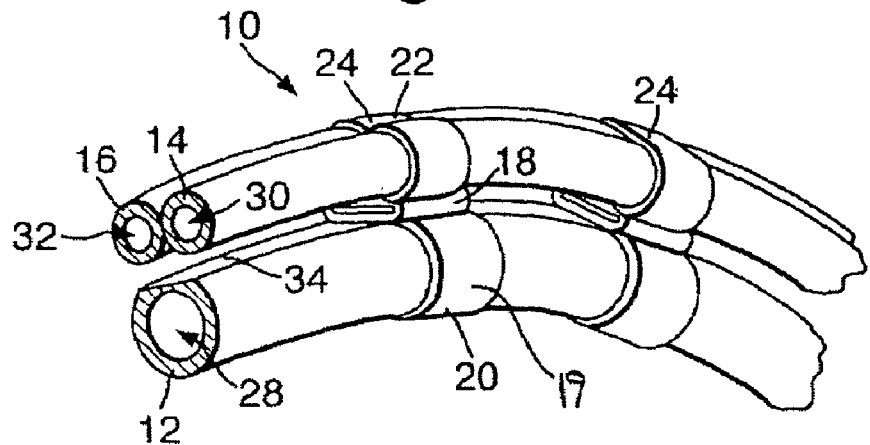
FIG. 1 is a perspective view of one embodiment of a hose assembly according to the present invention showing a flexible hose and co-extending flexible members held together by a plurality of individual restraining means and resilient mounting members.
Figure 2:
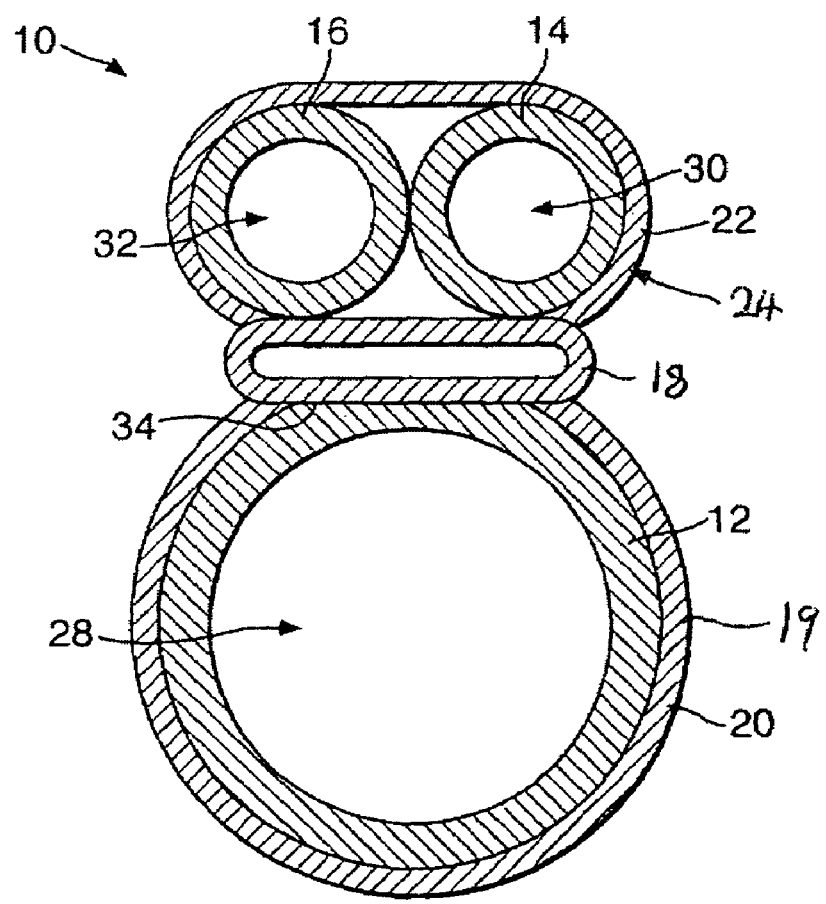
FIG. 2 shows an enlarged cross sectional view of the hose assembly as shown in FIG. 1.

Referring now to FIG. 1 and FIG. 2, a hose assembly 10 comprises a flexible hose 12 secured to co-extending flexible members 14, 16 by means of a plurality of intermediate resilient mounting means 18. In this embodiment there are two co-extending flexible members 14, 16, but it will be appreciated that the present invention is embodied where one or more co-extending flexible members are provided. The resilient mounting means 18 extends coaxially with the flexible hose 12 and the co-extending flexible members 14, 16. That is to say, while the resilient mounting means 18, the flexible hose 12 and the co-extending flexible members 14,16 are not concentric, their axes are all aligned such that they extend in the same direction. The resilient mounting means 18 interconnects a restraining means 19 which has a first portion 20 that extends substantially around the periphery of the flexible hose 12, and a second portion 22 which extends substantially around the periphery of the co-extending flexible members 14,16. In this embodiment the restraining means 19 and the resilient mounting means 18 together form a clipping arrangement 24.

In FIG. 2, the resilient mounting means 18 is shown as forming a loop between the flexible hose 12 and the co-extending flexible members 14, 16. The diameter of the loop increases as the resilient mounting means 18 is stretched, and decreases as the resilient mounting means 18 is compressed. The circumference of the loop is arranged such that it is in contact with the flexible hose 12 and the at least one co-extending flexible members 14, 16. For example, the resilient mounting means 18 may have a substantially flat face that abuts both the flexible hose 12 and the co-extending flexible members 14, 16. In this embodiment the resilient mounting means 18 comprises a plurality of individual mountings spaced apart along the length of the flexible hose 12 and the co-extending flexible members 14,16. This configuration is of particular advantage where the co-extending flexible members 14,16 are attached to the flexible hose 12 after manufacture, for example, in situ on an articulating assembly where the flexible hose 12 and co-extending flexible members 14,16 only travel along a common path for a part of their length.

The hose 12 and co-extending flexible members 14,16 define first, second and third conduits 28,30,32 respectively. The flexible hose 12 is formed with a flat surface 34 which the clipping arrangement 24 locates around. The flat face 34 ensures that the co-extending flexible members 14,16 and resilient mounting means 18 cannot rotate around the periphery of the flexible hose 12.

The restraining means 19 is employed to align the co-extending flexible members 14, 16 along the flat surface 34 of the flexible hose 12. While the co-extending flexible members 14, 16 may not run along the entire length of the flexible hose 12, in the described embodiment they are positioned on a section of the flexible hose 12 which will bend in use.

In an alternative embodiment, as presented in FIG. 3, the flexible hose 12 and co-extending flexible members 14, 16 may be secured to the resilient mounting means 18 by glue 40 provided on their communicating flat faces. This obviates the need for a restraining means extending around the periphery of the flexible hose 12 and co-extending flexible members 14,16.

In an alternative embodiment the restraining means portions 20,22 may extend only partially around the periphery of the flexible hose 12 and co-extending flexible members 14,16.

It will be appreciated that the restraining means 19 may be formed integral with the flexible hose 12 or the co-extending flexible members 14,16.

In a further embodiment the restraining means 19 comprises clips around the flexible hose 12 and/or the co-extending flexible members 14,16. That is to say, the restraining means 19 may be clipped around either the flexible hose 12 and/or the co-extending resilient members 14,16. Alternatively the restraining means 19 may be provided intact around part of the hose assembly 10 but comprise a clipping arrangement so that the flexible hose 12 and the co-extending flexible members 14,16 may be clipped together. This configuration is of particular advantage where the co-extending flexible members 14,16 are attached to the flexible hose 12 after manufacture, for example, in situ on an articulating assembly where the flexible hose 12 and co-extending flexible members 14,16 only travel along a common path for a part of their length.

It will also be appreciated that forming the first portion 20 of the restraining means 19 such that it substantially conforms to the shape of the periphery of the flexible hose 12 will spread the load of the co-extending flexible members 14,16 around the periphery of the flexible hose 12 thereby reducing wear and distortion in the regions where the restraining means 19 contacts the periphery of the flexible hose 12.

An alternative embodiment of the invention is presented in FIG. 4. Features common to the embodiment illustrated in FIG. 1 and FIG. 2 are referred to with the same integer numbers. A hose assembly 36 comprises a flexible hose 12 secured to co-extending flexible members 14, 16 by means of, and extending coaxially with, an intermediate resilient mounting means 38. The flexible hose 12 is formed with a flat surface 34 which the resilient mounting means 38 abuts. The flexible hose 12, co-extending flexible members 14, 16 and resilient mounting means 38 may be moulded as one assembly.

Alternatively only part of the hose assembly 36 may be moulded such that, for example, a hose 12 with integral resilient mounting means 38 is formed such that co-extending flexible members 14,16 can be attached when required.

In another embodiment the flexible hose 12, co-extending flexible members 14, 16 may be secured to the resilient mounting means 38 by non hardening glue. The glue 40 should have sufficient flexibility and elasticity such that the effectiveness of the glue 40 is not diminished through being worked by the motion of the flexible hose 12 and co-extending flexible members 14,16. The glue 40 may be provided along the full length of substantially flat face 34 of the flexible hose 12, co-extending flexible members 14,16 and resilient mounting means 38, such that all three components are in contact along the length of their common path. Such a hose assembly 10 may be manufactured like this or the co-extending flexible members 14,16 may be fitted to the flexible hose 12 as required, for example, in situ on an articulating assembly where the flexible hose 12 and co-extending flexible members 14 only travel along a common path for part of their length.

In use the hose assembly 10,36 extends from a proximal end to a distal end of an articulated assembly (not shown) and is in communication with a device positioned at the distal end of the articulated assembly. The articulated assembly swings in at least one dimension causing the hose assembly 10,36 to flex and bend. While the co-extending flexible members 14, 16 may not run along the entire length of the flexible hose 12, in the described embodiments they are positioned on a section of the flexible hose 12 which bends.

Since they are attached, the motion of the flexible hose 12 is dependent upon the motion of the articulating assembly. Likewise the motion of the co-extending flexible members 14,16 is dependent upon the motion of the flexible hose 12. In use, when the co-extending flexible members 14,16 are bent along the arc of a circle, constrained at either two locations (as shown in the examples presented in FIGS. 1, 2 and 3) or along the whole of path shared with the flexible hose 12 (as presented in the example presented in FIG. 4) a force acts normal to the surface of the resilient mounting means 18,38.

When the flexible hose 12 and co-extending flexible members 14,16 bend at right angles to the neutral axis of the hose assembly 10 the co-extending flexible members 14,16 will be caused to either bend around the outside or inside of the arc diameter formed by the flexible hose 12. Hence the co-extending flexible members 14,16 will either be stretched (if forced to bend around a diameter greater than the arc of the flexible hose 12) or compressed (if forced around a diameter smaller than the arc of the flexible hose 12).

The resilient mounting means 18,38 of the present invention relieves the stretching and/or compression in the co-extending flexible members 14,16 in two ways. When being stretched, a force normal to the bending direction causes the resilient mounting means 18,38 to contract, thereby reducing the diameter the co-extending flexible members 14,16 are caused to bend around. When being compressed, a force normal to the bending direction (and opposite to the direction when the co-extending flexible members 14,16 are being stretched) causes the resilient mounting means 18,38 to expand, thereby increasing the diameter the co-extending flexible members 14,16 are caused to bend around. Hence relief is provided as the distance between the flexible hose 12 and the co-extending flexible members 14,16 varies due to the resilience of the mounting means 18,38.

It will be appreciated that if the flexible hose 12 and co-extending flexible members 14,16 bend solely along their neutral axis then the resilient mounting means 18,38 will have no effect as it is configured to expand and compress when the flexible hose 12 and co-extending flexible members 14,16 bend in a direction at right angles to their neutral axis. It will also be appreciated that when the flexible hose 12 and co-extending flexible members 14,16 are bent solely along their neutral axis there is no relative movement between the flexible hose 12 and co-extending flexible members 14,16. Hence the co-extending flexible members 14,16 will not be stretched by their connection to the flexible hose 12 and the bending force will be substantially equal in the walls of the flexible hose 12 and co-extending flexible members 14,16.

The embodiment presented in FIG. 4 has a particular advantage in that the co-extending flexible members 14,16 are secured along their length to the flexible hose 12. Hence, when the co-extending flexible members 14,16 are put into compression during large relative movements of the flexible hose 12 and co-extending flexible members 14,16, the co-extending flexible members 14,16 will not be able to move away from the flexible hose 12 and hence will be prevented from buckling or kinking. This is of particular benefit if the co-extending flexible members 14,16 are fluid carrying conduits, as a buckled or kinked conduit would cause the fluid flow to be choked during a large bending motion. Likewise if the co-extending flexible members 14,16 carry electrically conductive or fibre optic elements, such elements will not be over stressed during a large bending moment.

The invention claimed is:

1. A hose assembly comprising:
   a flexible hose;
   at least one co-extending flexible member; and
   resilient mounting means forming a loop between the flexible hose and the at least one co-extending flexible member, the loop having a diameter, the resilient mounting means attaching the flexible hose and the at least one flexible member together for tandem movement, resilience of the resilient mounting means being such that, in use, when the flexible hose is subject to a bending force that compresses or stretches the at least one co-extending flexible member, a distance between the flexible hose and the at least one co-extending member is varied at a point where the resilient mounting means connect the flexible hose and the at least one co-extending flexible member together, thereby relieving the force on the at least one co-extending flexible member.

2. The hose assembly as claimed in claim 1, wherein the resilient mounting means extends coaxially with the flexible hose and the at least one co-extending flexible member.

3. The hose assembly as claimed in claim 1, wherein the flexible hose has a substantially flat face formed along its length against which is abutted the resilient mounting means.

4. The hose assembly as claimed in claim 1, wherein the resilient mounting means is adhered to the flexible hose and the at least one co-extending member by non-hardening glue.

5. The hose assembly as claimed in claim 1, wherein at least some of its constituent parts are formed integrally with each other.

6. The hose assembly as claimed in claim 1, wherein the resilient mounting means includes a plurality of individual mountings spaced apart along the length of the flexible hose and the at least one co-extending flexible member.

7. The hose assembly as claimed in claim 6, wherein an individual mounting includes restraining means that extend substantially around the periphery of the flexible hose.

8. The hose assembly as claimed in claim 7, wherein the restraining means include clips around the flexible hose and/or the at least one co-extending flexible member.

9. The hose assembly as claimed in claim 6, wherein an individual mounting includes restraining means that extend substantially around periphery of the at least one co-extending flexible member.

10. The hose assembly as claimed in claim 9, wherein the restraining means include clips around the flexible hose and/or the at least one co-extending flexible member.

11. The assembly as claimed in claim 1 wherein, in use, the flexible hose carries fluid, and the at least one co-extending flexible member includes at least one electrically conductive or fibre optic element.

12. The assembly as claimed in claim 1, wherein the diameter of the loop increases as the resilient mounting means is stretched and the diameter of the loop decreases as the resilient mounting means is compressed.

13. The assembly as claimed in claim 1, wherein the circumference of the loop is arranged such that it is in contact with the flexible hose and the at least one co-extending flexible member.

\* \* \* \* \*